Jan. 26, 1926. 1,570,818
E. W. ABRAM
TEAPOT, COFFEEPOT, AND THE LIKE
Filed Feb. 24, 1925

INVENTOR
Edmund W. Abram

BY
ATTORNEY

Patented Jan. 26, 1926.

1,570,818

UNITED STATES PATENT OFFICE.

EDMUND WILLIAM ABRAM, OF LONDON, ENGLAND.

TEAPOT, COFFEEPOT, AND THE LIKE.

Application filed February 24, 1925. Serial No. 11,129.

*To all whom it may concern:*

Be it known that I, EDMUND WILLIAM ABRAM, a British subject, residing at 135, 137, 139 Queen Victoria Street, London, E. C. 4, England, have invented certain new and useful Improvements in Teapots, Coffeepots, and the like, of which the following is a specification.

This invention has reference to improvements in tea pots, coffee pots and the like, and it consists in an improved removable strainer for use in a tea, coffee or like pot having a spout at its upper front portion, the said strainer being in the form of a slotted shutter attached to the lid of the pot and adapted to shut off that portion of the pot which is adjacent to the spout from the body portion for the purpose of retaining tea leaves or coffee or like grounds in the pot when an infusion prepared therein is being poured out.

My improved strainer is similar to the shutter described in the specification of the Patent No. 1,440,947 granted to me, but whereas the said shutter has a horizontal slot or slots formed in it, through which the infusion flows to the spout, the improved strainer has curved slots formed in it and shallow grooves or depressions are formed in its rear face adjacent to the slots. A straight horizontal slot weakens an earthenware or like shutter so that if it receives a hard knock it is liable to break across at the slot, and the main object of the present invention is to obviate this defect. Experiments made with earthenware or like shutters formed with curved slots show that they withstand a shock practically as well as a solid shutter without any slot. The chords of the arcs described by the curves of the slots may be horizontal or vertical or inclined as may be desired. The shallow grooves or depressions in the face of the shutter are provided for the purpose of deflecting tea leaves or grounds away from the slots.

The invention is illustrated in the accompanying drawing, in which:—

Figure 5:
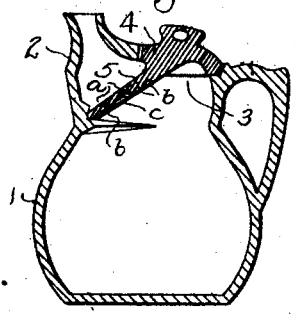
Fig. 5 is a sectional view of a tea pot having my improved strainer applied thereto.

In Fig. 5 of the drawings 1 indicates a tea pot such as shown in above-mentioned Patent No. 1,440,947, said tea pot having a spout 2 and the opening 3 at the top. 4 indicates the combined cover and strainer, said cover closing the opening 3 and having the strainer portion 5 which shuts off that portion of the pot which is adjacent to the spout from the body portion thereof, and which has slots therethrough through which the infusion flows in passing to the spout.

The parts thus far described, with the exception of the slots in the strainer, are or may be all as shown in said Patent No. 1,440,947.

Figure 1:
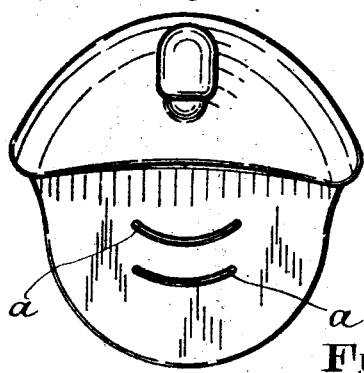
Fig. 1 shows in plan a combined lid and strainer similar to that shown in Fig. 3 of the drawings of the Patent No. 1,440,947, except that the slots in the shutter are curved instead of straight.
Figure 2:
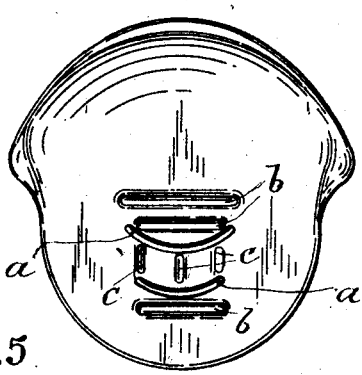
Fig. 2 is a rear view of Fig. 1 showing straight shallow grooves or depressions formed in the face of the shutter adjacent to the slots.
Figure 3:
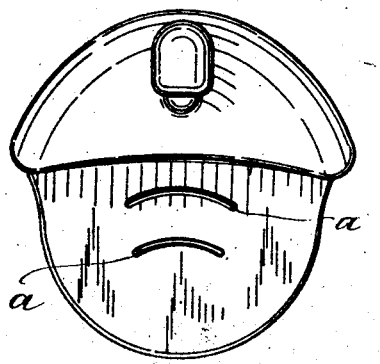
Figs 3 and 4 are plan views similar to Fig. 1 showing differently curved slots.
Figure 4:
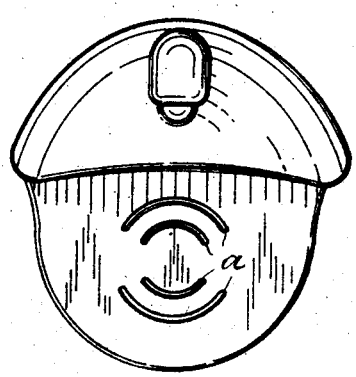

This combined strainer and cover 5 is removable from the pot and is handled separately to a greater or less extent when the pot is being washed or being filled and in order to give it added strength and thus reduce the liability of its becoming broken I have herein made the slots of curved formation. As illustrated in Figs. 1 and 2 the strainer portion 5 has two parallel slots *a* therein, both of which are curved, so that their ends are directed upwardly. In Fig. 3 I have shown a different arrangement wherein the two parallel slots *a* are curved so that their ends are directed downwardly, the curvature being the reverse of that shown in Figs. 1 and 2. In Fig. 4 I have shown an embodiment wherein four slots *a* are provided, two curved in one direction and the other two curved in the opposite direction.

The lid and strainer are made of earthenware and the provision of the curved slots makes the shutter stronger and much less liable to fracture than if the slots were straight.

I will preferably form the shutter portion with grooves or depressions *b* on its inner face, the purpose of these being to deflect tea leaves or coffee grounds away from the slots.

I have herein shown said grooves or depressions *b* both above and below the slots and in Fig. 2 I have also illustrated a plurality of vertical grooves or depressions *c* which are situated between the slots. These grooves or depressions may conveniently be used where the shutter is provided with two slots.

I claim:—

1. A tea pot, coffee pot and the like having a filling opening in its top and a spout at its upper front portion, and a removable cover having a strainer portion in the form of a shutter which closes the lower end of the spout, such shutter having slots therein through which the infusion flows in passing to the spout, said slots being curved thereby decreasing the danger of the shutter being broken.

2. A tea pot, coffee pot and the like having a filling opening in its top and a spout at its upper front portion, and a removable cover having a strainer portion in the form of a shutter which closes the lower end of the spout, such shutter having slots therein through which the infusion flows in passing to the spout, said slots being curved thereby decreasing the danger of the shutter being broken, said shutter being also provided with shallow grooves or depressions in its rear face adjacent the curved slots to deflect tea leaves or coffee grounds from the slots.

EDMUND WILLIAM ABRAM.